United States Patent [19]
Hebert

[11] Patent Number: 5,900,809
[45] Date of Patent: May 4, 1999

[54] METHOD FOR PROCESSING PRESSURE AND TEMPERATURE MEASUREMENTS IN A TIRE MONITORING SYSTEM

[75] Inventor: Jacques Hebert, St-Cloud, France

[73] Assignee: Michelin Recherche et Technique, S.A., Switzerland

[21] Appl. No.: 08/902,610

[22] Filed: Aug. 1, 1997

Related U.S. Application Data

[62] Continuation of application No. 08/587,862, Jan. 11, 1996, abandoned, which is a continuation of application No. 08/190,185, filed as application No. PCT/FR92/00710, Feb. 8, 1994.

[30] Foreign Application Priority Data

Aug. 8, 1991 [FR] France .................................. 91 10225

[51] Int. Cl.$^6$ .................................................. B60C 23/00
[52] U.S. Cl. ........................ 340/442; 340/445; 340/449; 73/146.5; 200/61.22
[58] Field of Search ...................................... 340/442, 445, 340/449; 73/146, 146.5; 200/61.22, 61.25

[56] References Cited

U.S. PATENT DOCUMENTS

| | | | |
|---|---|---|---|
| 4,760,371 | 7/1988 | Don ........................................... | 340/442 |
| 4,893,110 | 1/1990 | Hebert ...................................... | 340/442 |
| 4,909,074 | 3/1990 | Gerresheim et al. ..................... | 340/445 |
| 5,140,851 | 8/1992 | Hettich et al. ............................ | 340/448 |
| 5,192,929 | 3/1993 | Walker et al. ............................ | 340/442 |

*Primary Examiner*—Edward Lefkowitz
*Attorney, Agent, or Firm*—Alan A. Csontos; Robert R. Reed

[57] ABSTRACT

Under-inflation of a tire caused by natural deflation is subject to specific monitoring: a series is established consisting of all the averages of inflated air volume in each tire, calculated with each acquisition of pressure and temperature measurements; the maximum of the most recent averages is determined; an alarm is activated if this maximum value is lower than a threshold.

7 Claims, 1 Drawing Sheet

METHOD FOR PROCESSING PRESSURE AND TEMPERATURE MEASUREMENTS IN A TIRE MONITORING SYSTEM

This application is a continuation of application Ser. No. 08/587,862 filed on Jan. 11, 1996, now abandoned which is a Continuation of application Ser. No. 08/190,185 filed Feb. 8, 1994 now abandoned, filed as International Application PCT/FR92/00710 filed on Feb. 8, 1994 and which designated the U.S.

BACKGROUND OF THE INVENTION

1. Field of the Invention

The present invention relates to tire monitoring systems. More particularly, it concerns the use of measurements taken on the tires in view of giving one or several alarms.

2. Description of the Prior Art

The purpose of tire monitoring systems is to alert the driver of any anomaly which could occur to these or to one of these tires, as quickly and as reliably as possible. Among the tire operating parameters to be observed, there is certainly the inflated tire air volume. This can decrease either after a flat, or by natural deflation caused by diffusion through the tire itself, which is never completely impervious to air. Since direct measurement of the volume of air enclosed in the tire is not possible, one accesses it through pressure and temperature measurements. U.S. Pat. No. 4,703,650 describes a coding device which can be used to transmit the tire pressure and temperature from the wheel to the vehicle.

To give the driver reliable and useful information, it is desirable not to be satisfied with displaying the decoded values of the pressure and temperature measurements. Permanent consultation of these indications risks being tiresome and/or their interpretation problematic. These measurements are influenced by various disturbances such as the heat emitted by the brakes or on the contrary the cooling caused by the rim, such as the load transfers which cause slight variations of the volume of the tires, or such as the heat build-up of the tire due to its hysteretic losses.

This is why, in U.S. Pat. No. 4,893,110, a process has been proposed to use measurements based on comparisons between two or more tires which aims at being able to give an alarm in case of failure of a tire without adopting alert thresholds which differ too much from the accuracy attained by the coding/decoding device.

This processing although quite useful, does not allow for taking account of a loss of pressure affecting all tires almost equally, which is most often the case for natural deflation of tires. It is also desirable to do additional specific processing of available measurements for observation of natural deflation.

SUMMARY OF THE INVENTION

This is why a proposal is made for a process of using signals in a tire monitoring system of a vehicle, said system calculating an estimator of the mass of air contained in each tire, characterized in that:
- the average of the said estimators is calculated based on the measurements recorded at approximately the same time for several tires linking the vehicle to the ground,
- the said averages calculated after each measurement acquisition are stored in non-volatile (static) memory,
- the maximum of the said averages is recorded for a predetermined number of averages,
- an alarm is activated if the said maximum is less than a value considered as the minimum.

It therefore involves establishing an average among several tires and to monitor the deviation from this average. Maximum accuracy is obtained after a vehicle stops: thus this monitoring will be done at each start-up. Since natural deflation of tires is a slow phenomenon, it is enough to check it periodically to have sufficient monitoring of it.

Preferably, to estimate the mass of air contained in each tire, a measurement of the temperature is done by the system, at approximately the same moment as the measurement of the pressure for each tire, and the estimate is based on both measurements.

BRIEF DESCRIPTION OF THE PREFERRED EMBODIMENT

The illustration in the form of the attached flowchart (see FIG. 1), allows for good understanding of the implementation of the invention.

DETAILED DESCRIPTION OF THE PREFERRED EMBODIMENT

Figure 1:
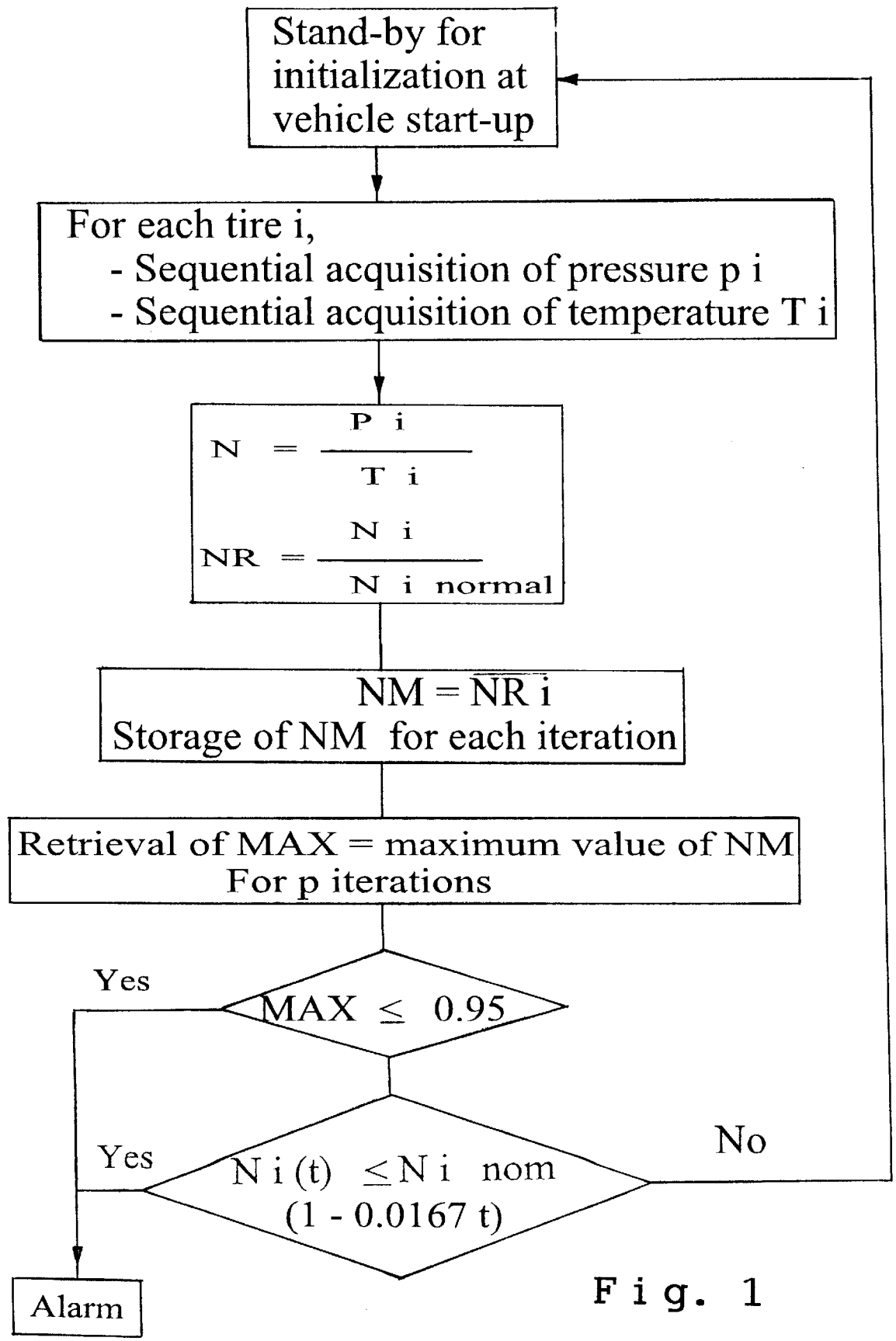

The experimental study has shown that monitoring based on an average of the inflation conditions of all the tires allowed for the phenomenon of natural deflation to be followed well. Also, it is preferable to proceed with checking at cold temperature rather than hot. From that time on, an additional requirement is added which aims at only checking under-inflation at cold temperature. For example, switching on can be detected at each start-up. The sum of these various requirements will lead to significantly reducing the number of specific monitorings of deflation, while making them more and more reliable.

From each acquisition of measurements of pressure $P_i$ and temperature $T_i$ for each of the i tires, the estimator of the mass of air is calculated preferably relative to the absolute pressure divided by the absolute temperature:

$$N_i = \frac{P_i}{T_i}$$

and it is expressed in a percentage relative to the nominal volume of air for each of the i tires:

$$NR_i = \frac{N_i}{N_{i\,nom}}$$

Then the average value of $NR_i$ is calculated, which, for a 4-wheel vehicle, equals $$NM = \overline{NR_i} = \frac{NR_1 + NR_2 + NR_3 + NR_4}{4}$$

and the value $NM_{max}$ is stored for each iteration. The maximum value of NM is extracted for the p most recent iterations, for example the last 10 and an alarm is activated if there was a loss of at least 5% of the volume of inflated air.

The invention also proposes comparing the residual pressure or residual air volume as measured at each start-up, to the theoretical condition for each tire that is obtained by calculation according to the following data:

$N_{i\,nom}$ corresponding to the volume of air introduced into the tire on the day of the most recent inflation or when pressure adjustment was done, time t which has elapsed since this most recent inflation, expressed in months, rate of natural deflation considered as normal, meaning for example 1.67% per month relative to the nominal volume of air, with this value including the tolerances on the measurement.

The value considered as minimal is obtained here by calculations, instead of being set at an absolute threshold. Comparison is made between $N_i$ and $N_{i\,nom}(1-0.0167\,t)$, for each tire, where t is expressed in months, and an alarm is given if $N_i$ is smaller than the minimum value calculated, decreased by a predetermined threshold, which in this case should be chosen relatively low, for example 2%. It is thus possible to detect inadequate imperviousness of the tire even before the tire has reached a pressure considered as inadequate. This permits inspection and preventive maintenance, since monitoring pressure wheel by wheel uses for a threshold a value which corresponds to 88% of the nominal pressure or even less, and monitoring of natural deflation uses for a threshold a value which corresponds to 95% of the nominal value.

In conclusion, the present invention proposes automatically checking the natural deflation of tires by using certain measurements only, considered to be recorded with greater reliability, and if necessary, checking if the result obtained can be considered as corresponding to a rate of natural deflation.

A monitoring system can very advantageously incorporate several causes for alarms: natural losses, as proposed here, disequilibrium of inflation for example on one axle as proposed in U.S. Pat. No. 4,893,110, and wheel by wheel monitoring relative to a critical threshold. Such a system which monitors several criteria greatly improves overall safety.

I claim:

1. Process for monitoring an inflation condition of a plurality of tires mounted on a vehicle, each tire containing a gaseous fluid which has a mass estimated by an estimator value and the plurality of tires supporting the vehicle on a surface, the process comprising:

providing at least two series of estimator values, each series comprising the estimator values, as determined at substantially the same time, for all of the plurality of tires;

calculating the average estimator value of said estimator values for each series to thereby obtain a set of average estimator values, the set having a maximum average estimator value;

comparing said maximum average estimator value to a predetermined threshold minimum value; and providing an alarm indication in response to a determination that said maximum average estimator value is less than the predetermined threshold minimum value.

2. A process according to claim 1 and further comprising determining the temperature of each tire at substantially the same time that the determination of the estimator values for each of the series of estimator values and calculating the estimator values as a function of the determined tire temperatures.

3. A process according to claim 2 wherein the temperature is the absolute temperature and further comprising determining the absolute pressure of each tire at substantially the same time that said absolute temperature and calculating each estimator value as a function of the ratio of the absolute pressure of the respective tire and the absolute temperature of the respective tire.

4. A process according to claim 2 providing an alarm indication includes calculating the estimator as a percentage of a nominal mass of the respective tire.

5. A process according to claim 1 wherein the estimator values of each series of estimator values are determined at approximately the same time as a given start up of the vehicle.

6. A process according to claim 1 having means to record the day at each reinflation process for each tire, and means to monitor the time elapsed since the day of most recent reinflation of each tire and means to select accordingly a preset rate of natural deflation, wherein the amount of gaseous fluid in each tire at the time of said reinflation is recorded, and wherein said predetermined threshold minimum value is established according to said amount of gaseous fluid introduced on the day of the most recent inflation, and according to said preset rate of natural deflation.

7. Method for monitoring inflated conditions of a plurality of tires of a vehicle, comprising:

providing at a selected time t a first series of inflated condition values grouping in the same series a plurality of inflated condition values representative of the inflated condition of every tire of said plurality of tires, each inflated condition value in said first series representing collectively the inflated conditions of the tires at approximately the same time t;

providing at least one additional series of inflated condition values in which the respective values of the at least one additional series and of any other additional series collectively represent the inflated conditions of the tires respectively each at the same time interval $t_{(n)}$ different from the other time intervals;

calculating the average value of each of the series of inflated condition values; and determining if the highest overall average value of all of the series of inflated condition values is within the tolerance range of a threshold value.

* * * * *